United States Patent
Berg et al.

(10) Patent No.: US 11,433,536 B2
(45) Date of Patent: *Sep. 6, 2022

(54) PROCESS UNDERSTANDING FOR ROBOTIC PROCESS AUTOMATION (RPA) USING SEQUENCE EXTRACTION

(71) Applicant: UiPath, Inc., New York, NY (US)

(72) Inventors: Christian Berg, Seattle, WA (US); Gregory Barello, Eugene, OR (US); Charles Park, Bellevue, WA (US)

(73) Assignee: UIPATH, INC., New York, NY (US)

( * ) Notice: Subject to any disclaimer, the term of this patent is extended or adjusted under 35 U.S.C. 154(b) by 383 days.

This patent is subject to a terminal disclaimer.

(21) Appl. No.: 16/575,600

(22) Filed: Sep. 19, 2019

(65) Prior Publication Data

US 2021/0086354 A1    Mar. 25, 2021

(51) Int. Cl.
  *B25J 9/16* (2006.01)
  *G05B 19/418* (2006.01)

(52) U.S. Cl.
  CPC ........ *B25J 9/163* (2013.01); *G05B 19/41885* (2013.01)

(58) Field of Classification Search
  CPC .............. G06Q 10/10; G06Q 10/06316; G06Q 10/0633; G06N 20/00; B25J 9/163; G05B 19/41885; G06F 9/30076; G06F 16/1815; G06K 9/6218
  See application file for complete search history.

(56) References Cited

U.S. PATENT DOCUMENTS

| | | | |
|---|---|---|---|
| 10,339,027 B2* | 7/2019 | Garcia | G06F 11/3409 |
| 2017/0060108 A1 | 3/2017 | Kakhandiki et al. | |
| 2018/0113781 A1 | 4/2018 | Kim et al. | |
| 2018/0197123 A1 | 7/2018 | Parimelazhagan et al. | |
| 2018/0341688 A1 | 11/2018 | Ganesh et al. | |
| 2018/0374051 A1* | 12/2018 | Li | G06Q 10/103 |
| 2019/0155225 A1 | 5/2019 | Kothandaraman et al. | |
| 2019/0324781 A1* | 10/2019 | Ramamurthy | G06N 3/088 |
| 2019/0325029 A1* | 10/2019 | Gandhi | G06F 40/284 |
| 2020/0050983 A1* | 2/2020 | Balasubramanian | H04L 9/065 |
| 2020/0206920 A1* | 7/2020 | Ma | G06K 9/6223 |

FOREIGN PATENT DOCUMENTS

EP    3133539 A1    2/2017

OTHER PUBLICATIONS

Kryon Process Discovery, Kryon Systems, Aug. 2018.
Assist Edge Discover, EdgeVerve.
Schmidt, Daniel, Where Should You Start Your Intelligent Automation Journey?, Kofax, Apr. 2019.
Epiplex RPA Process Discovery, Epiance Software.

* cited by examiner

*Primary Examiner* — Thomas C Lee
*Assistant Examiner* — Michael Tang
(74) *Attorney, Agent, or Firm* — Volpe Koenig

(57) ABSTRACT

A sequencing model may be utilized for captured steps of a workflow of an application. The sequencing model may determine processes and state transitions for the captured steps. A variance, a judgment action, or a rule-based action may be identified based on the sequencing model and changes of a log file of actions in relation to the captured steps. A hierarchy may be generated based on the identified variance, the judgment action, or the rule-based action to automatically generate an automated workflow for robotic process automation (RPA) by a robot.

20 Claims, 8 Drawing Sheets

PROCESS UNDERSTANDING FOR ROBOTIC PROCESS AUTOMATION (RPA) USING SEQUENCE EXTRACTION

BACKGROUND

Robotic process automation (RPA) may automate repetitive operations, functions, or workflows in enterprise platforms, virtual machine (VM) configurations, remote desktops, cloud computing, desktop applications, mobile applications, or the like. Certain processes including activities, states, tasks, or the like may be critical, prioritized, or high value for automation by RPA. To discover, capture, mine, identify, design, or the like processes for RPA may be time, resource, or computing intensive, especially when performed in part or whole manually. In addition, manual discovery or design may undesirably expose personal information or data for enterprise or mobile applications in RPA automation.

For process understanding in RPA, sequences or patterns may be determined or extracted from application, user, or the like logs, records, or files. Existing sequence extraction configurations may miss, misinterpret, or overlap critical tasks of automating a process of an application for RPA. It is desirable to discover processes and state transitions with sequence extraction of critical or prioritized tasks for RPA.

SUMMARY

Methods and apparatuses are given to discover, mine, capture, or the like distinct processes and state transitions using sequence or pattern extraction and to prioritize processes or tasks for automation by a robotic process automation (RPA) robot(s). A workflow may be designed or redesigned for automation by RPA while reducing manual input. Process documentation may be generated and exported based on process understanding.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
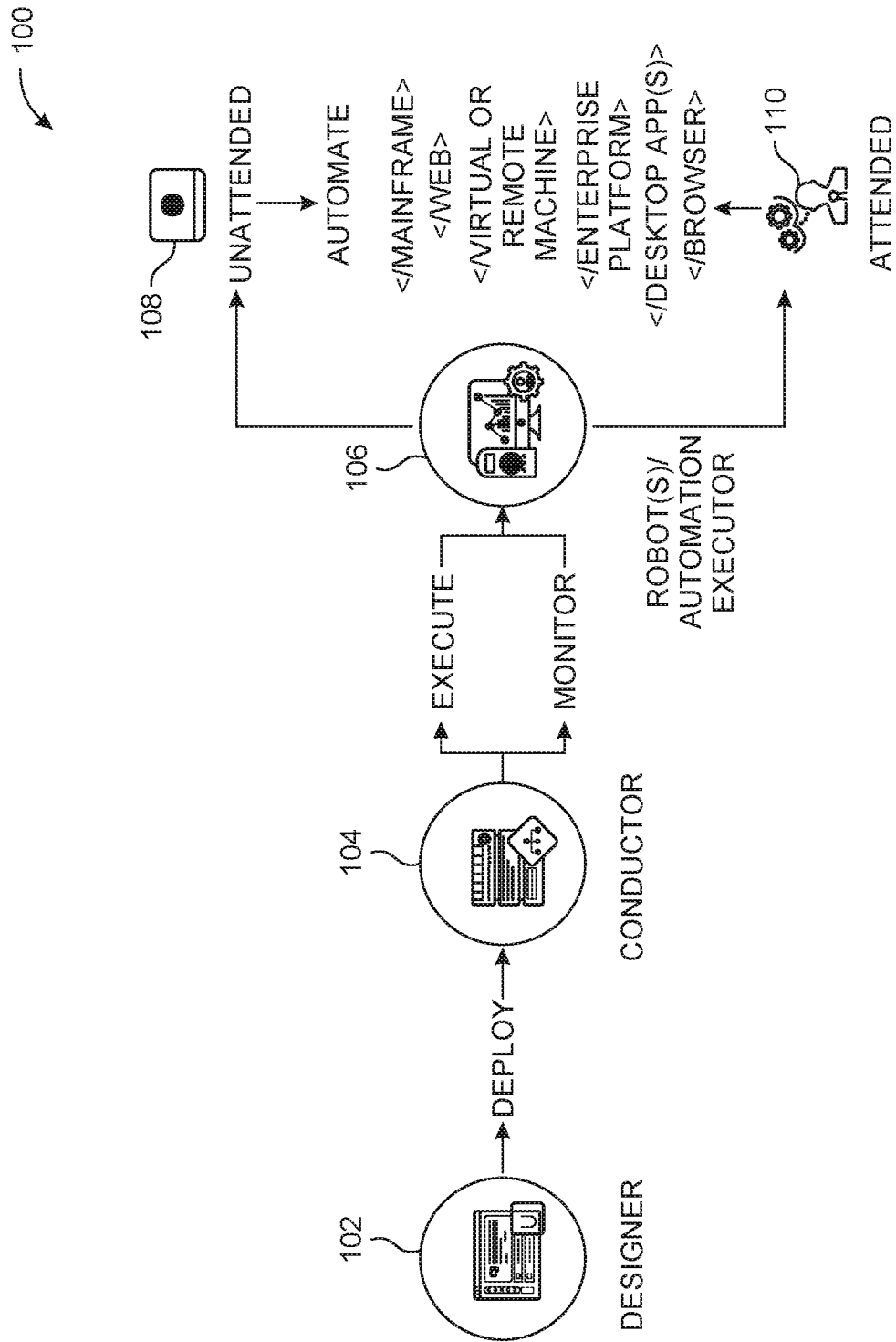
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be WIN32, Java, Flash, hypertext markup language ((HTML), HTML5, extensible markup language (XML), Javascript, C #, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
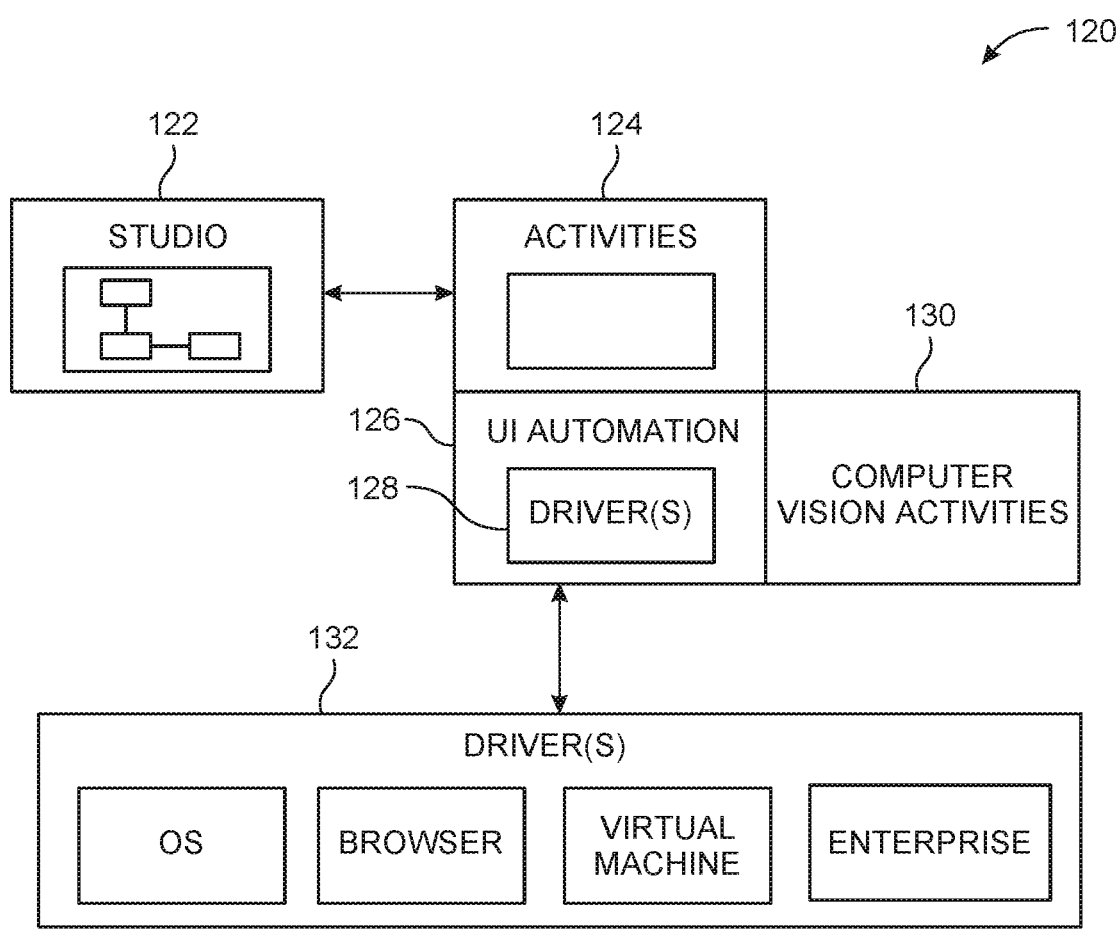
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
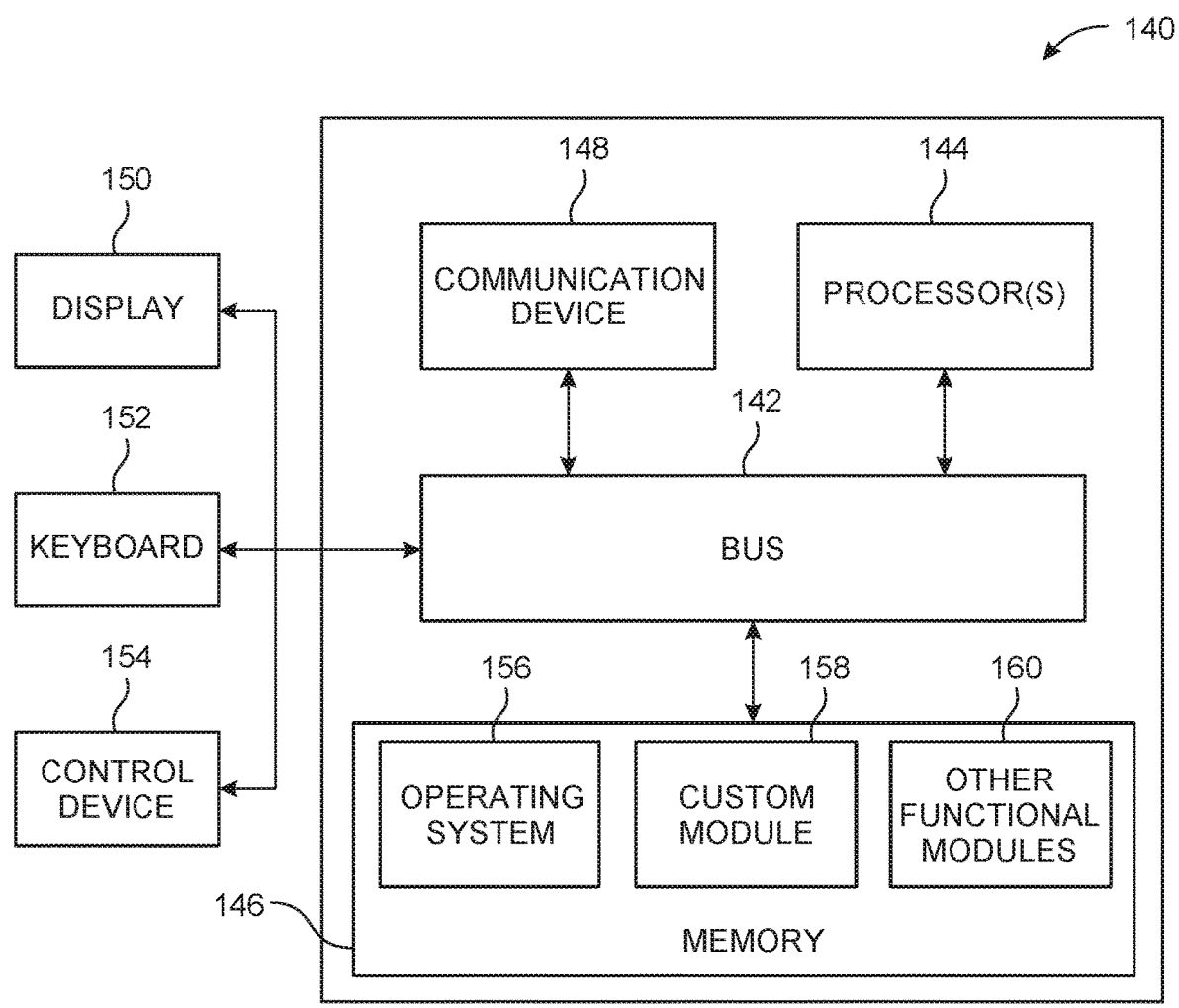
FIG. 1C is an illustration of a computing system or environment.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Figure 2:
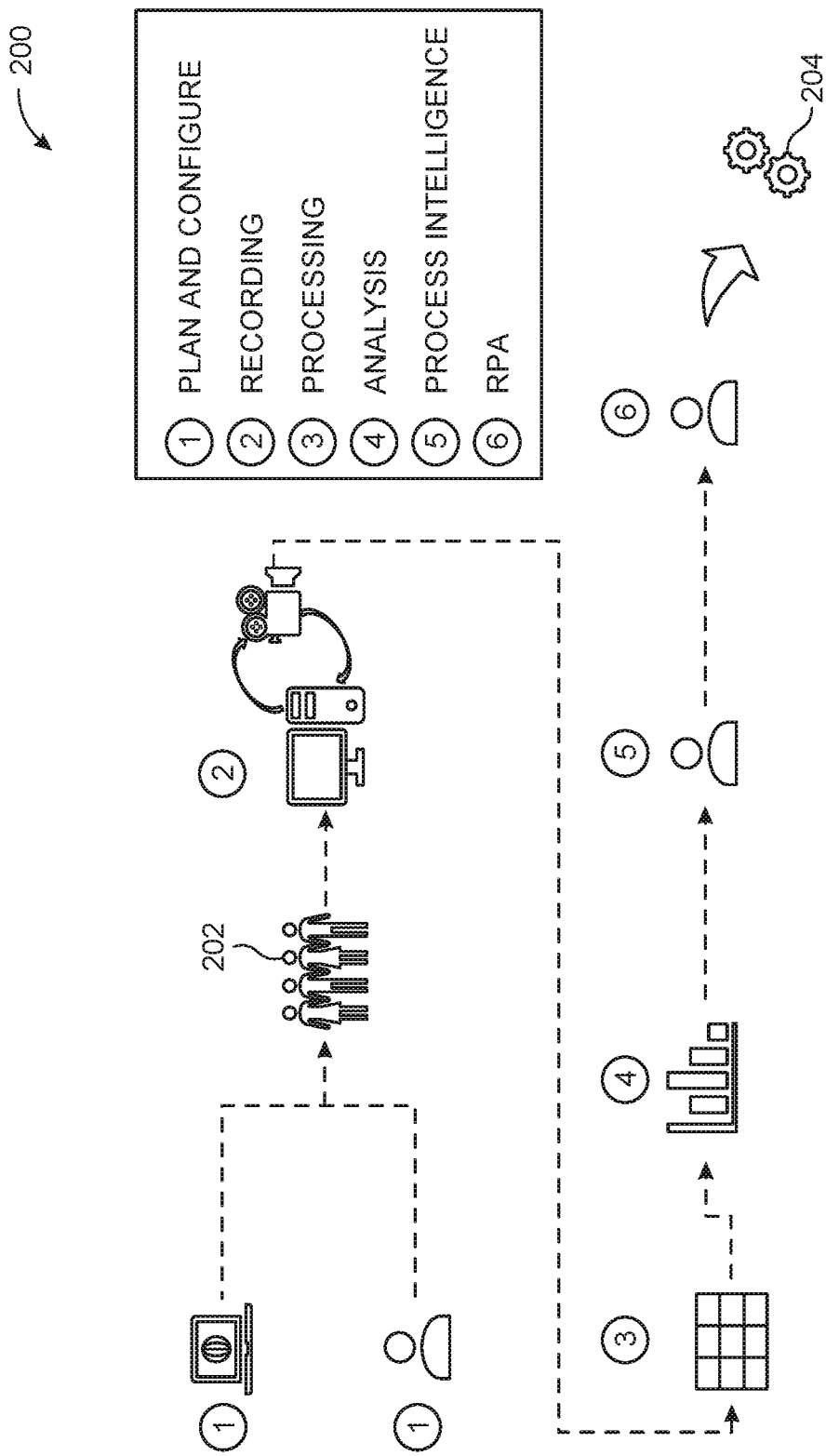
FIG. 2 is an illustration of discovering, mining, or identifying process sequences or patterns.

FIG. 2 is an illustration of discovering, mining, or identifying process sequences or patterns 200. A recorder or collector application, applet, data structure, software component, or the like may be downloaded directly or indirectly from a service provider or central administration (1). A recorder or collector may monitor work on an enterprise application, enterprise platform, virtual machine (VM), remote desktops, desktop application, mobile application, or the like transparently and non-obstructively. Record or collecting may be performed for subsequent RPA automation by one or more robots operated by an orchestrator or similar component.

A recorder or collector may be configured or arranged such that existing implementations require minimal redesign. A recorder or collector may operate in part in a central, distributed, decentralized, or cloud-based location, or the like. Telemetry input(s) or data may also be utilized by the recorder or collector for sequencing, as described herein. Telemetry, like other data streams from a recorder or collector, may be used as additional data points to cluster or define actions, states, sequences, or processes. Telemetry may also provide useful feedback to product or application usage that will enable substantially real time recommendations, suggestions, or the like. In certain configurations given herein, continuous model improvement may be configured to build a standardized functional library based on automatically generated one or more workflows.

A user of one or more users 202 or a manual input source may be configured or utilized to select at least one group of a plurality of groups to capture work or data of the group (2). In certain configurations, groups may be formed based on performance of similar tasks. Moreover, captured work or data may be encrypted, compressed, secured, or the like. The captured work or data of the group may be stored in a log file or a record file. Sources of captured data may include video, screenshots, screenshots with a timestamp, metadata files, databases, or the like.

A log file may include one or more screenshots, screenshots per customer, tree data, domain object model (DOM) tree data, UI elements, one or more selectors, an action type, clipboard content, user computing activity, or the like. The log file or record file may be uploaded for centralized, cloud, or the like analysis. An analysis may display the progress of the processes. Moreover, similar or common actions of the log file or record file may be identified to generate a new version of a log file or record file that includes sequence of actions represented in clusters, groups, or the like.

A log file or record file may include screenshots, tree data, or selectors that are noisy, dynamic, or variable such that identifying or distinguishing two or more actions as similar or the same may be non-trivial. Identification of similar UI elements may be performed by vectorizing, selecting, and using optical character recognition (OCR). For OCR, a time-shared many-to-many search algorithm may be utilized to label process iterations based on OCR of one or more screenshots, UI elements, or the like. In certain configurations, categorical hidden Markov Models may be utilized for sub-process identification with an autoregressive component, dendograms utilized to address erroneous selector variation, or the like.

In certain configurations, a log file with automation layer information and screenshots with all applicable metadata may be clustered using various dynamic techniques to represent unknown data in an appropriate format for intelligent action, state, or sequence representation. For instance, Bayesian and probabilistic modelling and heuristic processes may be configured to identify optimal or desirable clusters for the correct sequence representation.

Sequence or pattern extraction for RPA may be modified to recognize frequently occurring short and meaningless sequences. Process discovery or mining may be configured to identify processes, predictable actions, repeatable actions, series of identifiable actions, or the like based on log files or record files. Process mining may also allow identification of processes with high impact relative to costs for automation or RPA. In certain configurations, this may be achieved without or limited access to known schemas and proprietary information technology (IT) system or network configurations.

Visualization may be configured for building workflows for process understanding or RPA automation. For instance, a custom visual may be configured to yield predictable filtering results by varying a distance threshold. Visualizations generated with TimelinePI may also be utilized for the examples given herein for automatic workflow generation and processing understanding. In certain configurations, query systems of record (SOR) may be utilized for building workflows for RPA automation where distinguishing between rule-based, judgement-based, time, or processing decisions, or the like may be a lesser priority.

In certain configurations, workflows may be automatically configured by deriving implicit decision criteria. This procedure may significantly reduce RPA implementation cost and generate better outcomes. Post implementation, automatic workflow operation may lower robot redesign costs. In addition, in the examples given herein, standards, functional methods, logical components, or the like may be utilized to discover, mine, capture, or the like distinct processes and state transitions using sequence or pattern extraction for RPA. This may be achieved while reducing manual input.

In certain configurations, a log file or record file may include screenshots, customer specific screenshots, tree data, data selectors, activity selectors, action types, clipboard content, or the like. Sequence or pattern generation may be configured to identify actions, generate human readable labels for actions, action motivation, process variations, process start state, process end state, process performance time, or the like. States may include ready to register new customer, record updated, confirmation of change, error state, submit, open, approval, computer UI Elements, such as Win32 UI automation, or the like.

In certain configurations, identifying process sequences or patterns for automation may utilize configurations using a recorder or collector to capture detailed processes of enterprise applications, enterprise platforms, VM, remote desktops, desktop applications, mobile applications, or the like. A sequence model may be configured to discover distinct processes and state transitions. The sequence model may distinguish between meaningful and irrelevant variance, judgement actions, rule-based actions, or the like. In certain configurations, sequencing may be performed as part of a mining operation.

A hierarchy may be generated based on discovered or mined distinct processes and state transitions. A hierarchy may be represented at different levels of abstraction, functional methods, or page objects for actionability. Page objects may be code objects such as a submit button, logging-in, closing a window, minimizing a window, or the like. Discovered actions may be described based on these code objects and searched together. This configuration may allow generation of test automation scripts for discovered or as-is tasks and processes. In certain configurations, the hierarchy may be an exponentially decaying hierarchy having overlap between a functional cluster, flat clusters (fclusters), or the like. A hierarchy may also include manually labelled process iterations based on optimal cluster length.

Discovered distinct processes and state transitions may also be generated for visual validation (3). Validation of a visual may utilize manual input or additional robotic actions. Discovered distinct processes and state transitions may be ranked based on criticality, priority, value, or the like for RPA automation (4). Ranking may include determining the top X sequences, ranking by p-value, ranking with entropy, or the like.

A p-value may be utilized to determine the significance of results of a hypothesis test or claim. The claim may represent the null hypothesis. An alternative hypothesis may be the result if the null hypothesis is found to be false or untrue. A p-value may be between 0 and 1 where a small p-value may indicate strong evidence against the null hypothesis or to reject the null hypothesis. A large p-value may indicate weak evidence against the null hypothesis or failing to reject the null hypothesis.

In sequence ranking statistics, where an extracted sequence is ranked by their p-value, a ranking may be augmented with a number of other statistical quantities or parameters. Entropy of the sequence prefix and suffix may be a desirable statistical parameter to quantify uncertainty of the following or previous action to a sequence. For instance, if the next or previous action has low uncertainty or entropy, then it may be more appropriate to extend the sequence to include the next or previous most frequent action. In another configuration, an entropy of the subsequent step of substantially zero may signify it is always the same action, and the sequence may be extended to include that action. The entropy in the sequence ranking may be configured by sorting sequences based on the product of the p-value and the entropy. In certain configurations, entropy may be the sum of the prefix and suffix entropies.

Process intelligence (5) by further validation or reengineering of a generated workflow may be configured. In the examples given herein, process design or redesign may be configured to utilize a flexible process design document (PDD) for workflow export 204 and RPA (6). An export may include robot configuration details, operation variables, operating parameters, troubleshooting, or the like to assist or implement RPA.

Figure 3:
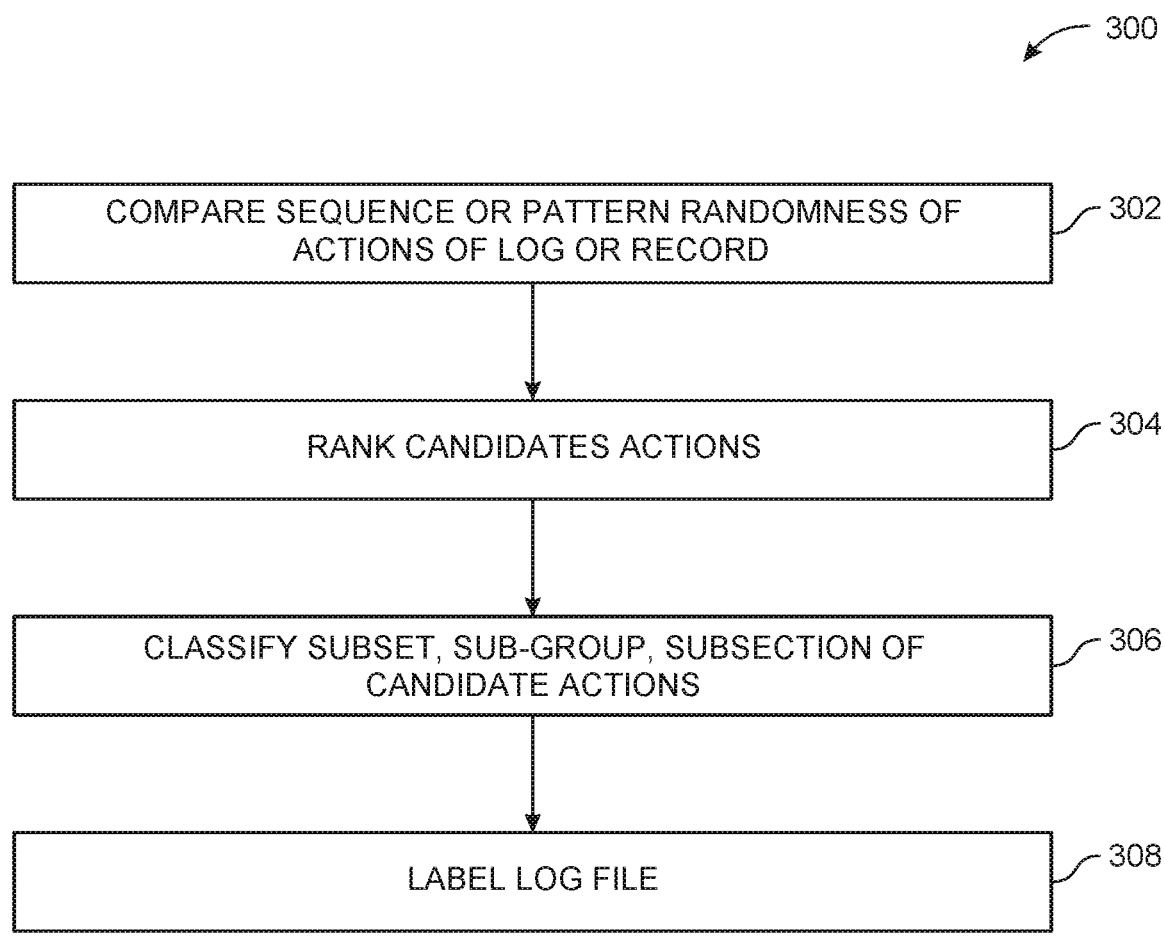
FIG. 3 is an illustration of analyzing randomness of a log file or a record file for sequence or pattern extraction.

FIG. 3 is an illustration of analyzing randomness of a log file or a record file for sequence or pattern extraction 300. A sequence or pattern extraction may be configured to compare a sequence of actions that appears in a new version of a log file or a record file. In certain configurations, the comparison may involve determining sequence or pattern randomness (302) and the least random may be selected or chosen as a candidate of actionable or valuable tasks. Candidate actions may be ranked (304) based on the randomness or another metric, as desired. A subset, sub-group, subsection, or the like of the candidates may be labelled. A subset, sub-group, subsection, or the like of candidate actions (306) may represent an individual candidate or class. A candidate may be a sequence or sub-sequence for which significance is being tested, alone or in conjunction with others, to be a discovered process. An exhaustive process may be configured such that all candidates, permutations, combinations, or the like that exceed X cut in frequency may be tested. A version of a log file may be labelled (308) with the individual sequence or pattern of extraction. In certain configurations, a sequence may be ranked by quality, importance, relevance, or the like.

Sequencing or pattern extraction may result in actions being identified with associated human readable or identifiable labels. Other results of the configurations given herein may include reasons for actions being taken including variations of a process, determining different actions of a similar or same process, a start and end state of each process, process time span, or the like.

Figure 4:
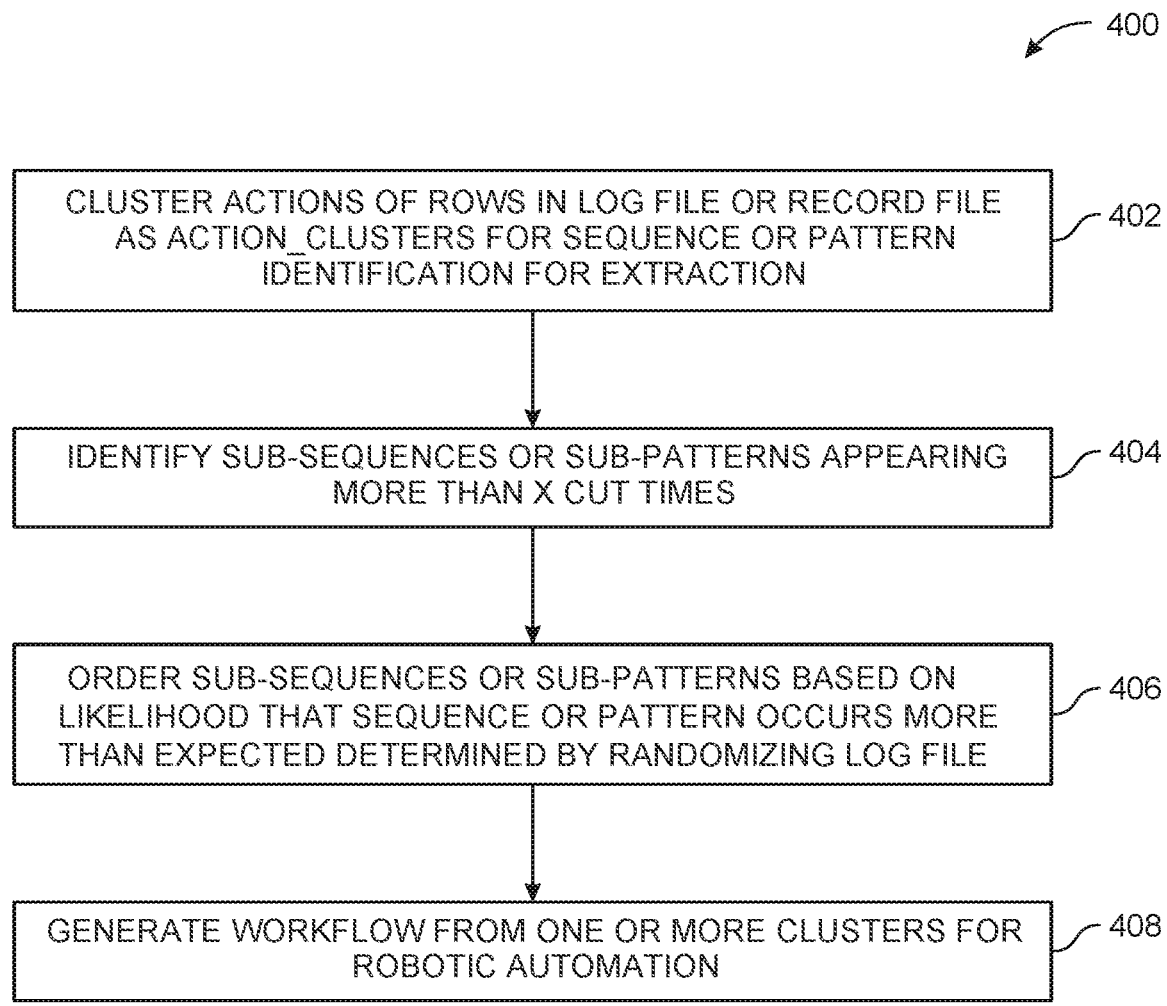
FIG. 4 is an illustration of sequence or pattern extraction by clustering actions for sequence identification for extraction in a log file or record file.

FIG. 4 is an illustration of sequence or pattern extraction by clustering actions for sequence identification for extraction on a log file or record file 400. In certain configurations, sequence or pattern extraction may be formed by clustering rows or columns of actions for sequence identification followed by extraction performed in a log file or record file of action_clusters (402). Sub-sequences, sub-patterns, or the like that appear more than X cut times in the log may be identified (404). Sub-sequences or sub-patterns may be ordered based on likelihood that a sequence or pattern occurs more than expected determined by or based on randomizing a log file (406). In other configurations, sub-sequences, sub-patterns, or the like may also be ordered based on likelihood that a sequence or pattern occurs more than a predetermined number of times if the log was random. Generate workflow from one or more clusters for robotic automation (408).

In certain configurations, a statistical model of the cluster_indices may be utilized where each row or column may be random with the probability of each action being equal to frequency within a log file or record file. Sequence instances may be extracted and represented using a patricia trie data structure or the like for fast searching. A patricia trie may be a variant of radix 2 or binary trie where, rather than explicitly storing every bit of every key, nodes may store the position of the first bit, which differentiates two sub-trees. During traversal, an indexed bit of the search key may be examined and a left or right sub-tree may be chosen.

In a statistical sequence or pattern model for process understanding, frequent sequences from one or more log files or record files may be extracted based on one or more application parameters. In data mining for frequent sequence extraction, such as PrefixSpan, some results may be undesirable, especially short frequent sequences that may be low priority. In certain configurations, statistical models of sequences may be utilized to find the most statistically relevant sequences beyond the most frequent. For instance, a random sequence model configuration may assume that each row in the log is an independent random action uncorrelated with the previous or subsequent action.

In a random sequence model configuration, probabilities of each action may be modeled using their frequency in a log file or record file. For example, for a log L=r0, r1, r2, . . . , r_N, an action $a\_i$ may be assigned the probability $P[a\_i]=|\{i:r\_i==a\_i\}|/N$. That is, the fraction of the log which is represented by this action. A plurality or all sub-sequences of the log may be ranked or sorted by the probability of occurrence, using a p-value, randomization, or the like. In certain configurations, a model using a p-value may be based on a null hypothesis and randomized log. In certain configurations, sequences that occur often or greater than a predetermined amount when compared to a random trial may be selected or signify statistical importance.

For certain models, computing the probability that a sequence S of length l occurs n times in a log file or record file of length N given certain probabilities may be intensive. In response, approximation by an exact sequence match may be performed where the sequence extraction and ranking is based on an exact match in the sequence. In certain configurations, an exact sequence may be a sequence S appearing exactly in the log or record occurring without substantial lags, gaps, or the like. An approximation may be performed in this configuration by modeling as a sequence of N/l Bernoulli trials where the probability of each trial is given by the prior probability that any given sequence of length l is equal to S.

Approximation may also be performed on a lagged sequence or pattern match with lags, gaps, or the like. If a sequence is $S_X=s\_0,s\_1,s\_2$ and a log or record contains the sequence $[s\_0,s\_1,R,s\_2]$ where R is any action, this may be identified or counted as an occurrence of $S_X$. In certain configurations, $S_X$ may be designated with decreased weight due to lags, gaps, or the like.

Subsequent to sequence or pattern extraction, de-noising may be performed by finding alignment of the top sequences with the log or record that optimizes an objective function, such as minimizes a p-value. In this configuration, rows in the original log or record will be disregarded. Optimizing an objective function may reduce the probability of a random chance of ignoring rows or columns in the log or record while maintaining the rows or columns in a sequence.

A de-noised log file or record file may include original elements or portions of the original log. For efficient optimization, recursion or hierarchical extraction may be performed. Recursion may be performed by iterating extraction and de-noising on an existing de-noised log or record. This operation may clean or improve a log or record at the expense of removing portions of a signal as well as noise in the data. In this configuration, quantifying or approximating lost signal portions of the data may be difficult.

Hierarchical sequence or pattern extraction may be performed by constructing a tiled log file or record file. In certain configurations, a tiled log or record file may include a sequence of sequence identities used to tile and form a de-noised log or record. A log of an extracted sequence that may be critical may be tiled to find instances of the sequence in the log itself. This operation may also be performed to de-noise the log by keeping parts of the log that can be covered by important sequences. Hierarchical extraction may involve repeating extraction, de-noising, and recursion on a tiled log. Hierarchical sequence or pattern extraction may squash a tiled log so that repeated sequences or patterns of actions may be reduced to a single action or sequence instance. For instance, squashing may reduce (1,1,1,2,2,2, 2,3,2,1,1,1) to (1,2,3,2,1). Certain squashing algorithms may involve saving sequences in the tiling algorithm to generate the de-noised log for the final level of recursion. This sequence or pattern extraction may be desirable for data with low noise.

Sequence or pattern extraction may be repeated to determine a hierarchical flow of tasks, actions, or the like. Actions described using hierarchical flow representation may result in multi-level abstraction based on keywords and obfuscated versions of screenshots. A discovered flow may be prioritized for the RPA.

In certain configurations, sequence or pattern extraction may check occurrences in the log file or record file based on action type and frequency. Actions that occur in a time period may be labeled, characterized, distinguished, or the like. A set of subsequent actions may be pre-defined, set, user defined, or the like. A statistical model may select the action occurring after the action that has the least random distribution of occurrences and associates the actions as one or more sequence. This operation may be iterative to build or construct longer sequences or patterns. This sequence or pattern extraction may be desirable for data with more noise and more randomness.

Discovery, mining, or identification of distinct processes and state transitions using sequence or pattern extraction may be desirable for small and medium enterprises (SMEs), centers of excellence (COEs), single user, business analysis (BA), RPA development, or the like. For SMEs, reduction of time for documenting or explaining current processes and policies may be achieved. Improved privacy and sharing control may also be achieved by excluding manual input. Improved privacy and sharing control may also be achieved when process understanding is operated or configured locally.

BA or COE implementations may benefit from quickly prioritizing RPA processes or tasks, reduced costs through documenting human business operations, risk reduction by automation of complex tasks typically assigned to inexperienced users, or better compliance to organizational policies with improved documenting processes. In addition, RPA Development may accelerate through automated PDD and draft workflow generation. Less code maintenance time due to standardized hierarchies may be another desirable outcome.

In certain configurations, automatically generated workflows may be tracked beyond deployment to enhance or improve Extensible Application Markup Language (XAML) export. During sequencing, with multiple good output candidates for a task or even complete workflows, an initial execution function may be configured to test live performance, request manual input, suggest a reduced list of options, suggest a next step, perform inference validation, or the like.

Referring again to log or record tiling, an exact match operation may be configured as follows. Sequences or patterns may be sorted by length, such as from longest to shortest. At the beginning of each log or record, the longest sequence that matches the log starting the current log position may be searched. Once the longest matching sequence is found, the operation may move to a point in the log at the end of the just-found sequence and repeated until substantially the whole log is completed.

In a density-based operation, a log or file may be tiled using instances of the sequences with the highest p-value density. Density log or file tiling may tolerate lags such as one or more extra actions that may occur within a sequence instance. Every instance of each sequence, with or without lags, may be found and then sorted by p-value density. For certain configurations, a p-value density may be the ratio of the sequence p-value and the total length of the sequence instance. Each instance starting from the most p-value dense may be selected and included in tiling. This may be performed if the sequence instance contains at least one row of the log which is not contained in an already-used sequence instance and the sequence does not share its starting row with any other already used sequence instance. In certain configurations, density log or file tiling may allow sequence instances to overlap without two sequences to overlap completely, or for two sequences to start at the same place, but contain a different number of lags, gaps, or the like. Sequences overlap may be desirable to discover overlapping process fragments and a true process may be the concatenation of two or more sequences.

Lag based tiling may be desirable in certain configurations. Lag based tiling may allow lags and disallow sequence overlap. A log of one row may be processed one at a time and the lagged sequence with the highest p-value density starting at a predetermined location found or discovered. Once a sequence is chosen, the process may move to the next row in the log after the sequence instance terminates.

In the examples given herein, for action identification, one or more logs or records having screenshots, UI elements, selectors, or the like may be noisy and dynamic to point that two actions may appear similar or the same. Vectorizing, using selectors, or using an OCR engine may be utilized to determine interactions with the same selector, UI element, or the like. Vectorizing may designate two selectors to be similar if they are close in the graph of the DOM tree. A set of tags may be defined which are of interest, such as "name", "role", etc., and each row in the log may be assigned using a label using the tags in the first and last selector element. Rows with other rows that have substantially identical labels may be clustered. In certain configurations, clusters with fewer than min_samples members, a parameter specified at run-time, or automatically determined without manual input may be considered noise.

Action identification using selectors may cluster rows based on correlations between words in one or more selectors. The set of all words or alphanumeric strings of characters may be formed in the first and last selector elements and ordered arbitrarily or randomly into words $w\_i$. The log or record rows may be represented as vectors where the i th element of the vector is 1 if this rows selector contains $w\_i$ and 0 otherwise. Principal component analysis (PCA) may be performed on these vectors. In certain configurations, PCA may be configured such that 90% of the overall variance is retained. Clustering may be performed on these vectors using k-means where a range of number of clusters is tried. A cluster that maximizes an unsupervised metric of cluster quality, such as based on a silhouette score, may be selected. Density-based spatial clustering of applications (DBSCAN) clustering may also be configured using parameters determined by the final k-means clustering.

Moreover, action identification with OCR may be performed similar to selector based identification but generate vectors using words or alphanumeric strings in the OCR output instead of on selector elements. In certain configurations, generating vectors using words or alphanumeric strings in the OCR output may be referred to as action_clusters. In this configuration, logs with 100 k rows may generate 100 and 1000 unique actions based on a min_samples setting.

Figure 5:
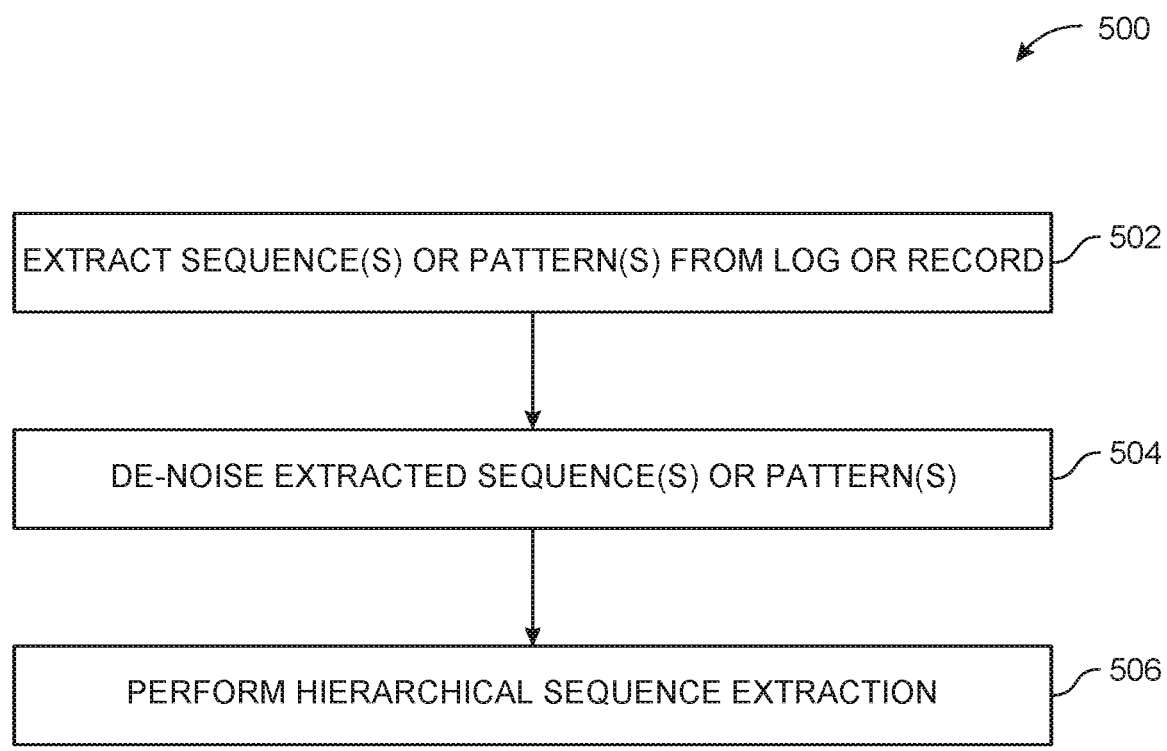
FIG. 5 is an illustration of sequence or pattern extraction for process understanding.

FIG. 5 is an illustration of sequence or pattern extraction for process understanding 500. For this configuration, sequence or pattern extraction may include 1) extraction, 2) de-noising, 3) recursion, and 4) hierarchical extraction as given as follows. Sequence or pattern extraction (502) on a log or record of action_clusters may be performed, after rows are clustered to identify actions. One or all sub-sequences may be identified that appear more than cut X times in the log. A cut may be as little as 1 times. The sub-sequences may be ordered based on unlikelihood of occurrence of a predetermined time in a random log. A statistical model of the cluster_indices may be used in which each row is random with the probability of each action being equal to its frequency within the log. Sequence instances may be extracted and represented using a patricia trie data structure.

De-noising may be performed on extracted sequences by finding alignment of top sequences with the log that minimizes the p-value allowing one or more rows in the original log to be ignored with ignoring the one or more rows in the sequences. Minimizing the p-value in a log may include making it unlikely to have occurred by random. Log tiling or approximation may be performed for de-noising optimization. Recursion may be used in certain configurations by re-performing extraction and de-noising on a previously de-noised log.

Hierarchical sequence extraction (506) may be performed for sequence extraction by constructing a tiled log. In certain configurations, recursion may be utilized for the hierarchical sequence extraction. A tiled log may be the sequence of sequence identities used to tile and form the de-noised log in step 3). Hierarchical sequence extraction may be configured to iterate steps 1)-3) on the tiled log. Squashing may also be performed on a tiled log or record by reducing repeated sequences of actions to a single action, a reduced number of actions, a sequence instance, or the like. Hierarchical sequence extraction may be configured to save sequences that were used in the tiling configuration to generate the de-noised log for final recursion.

Figure 6:
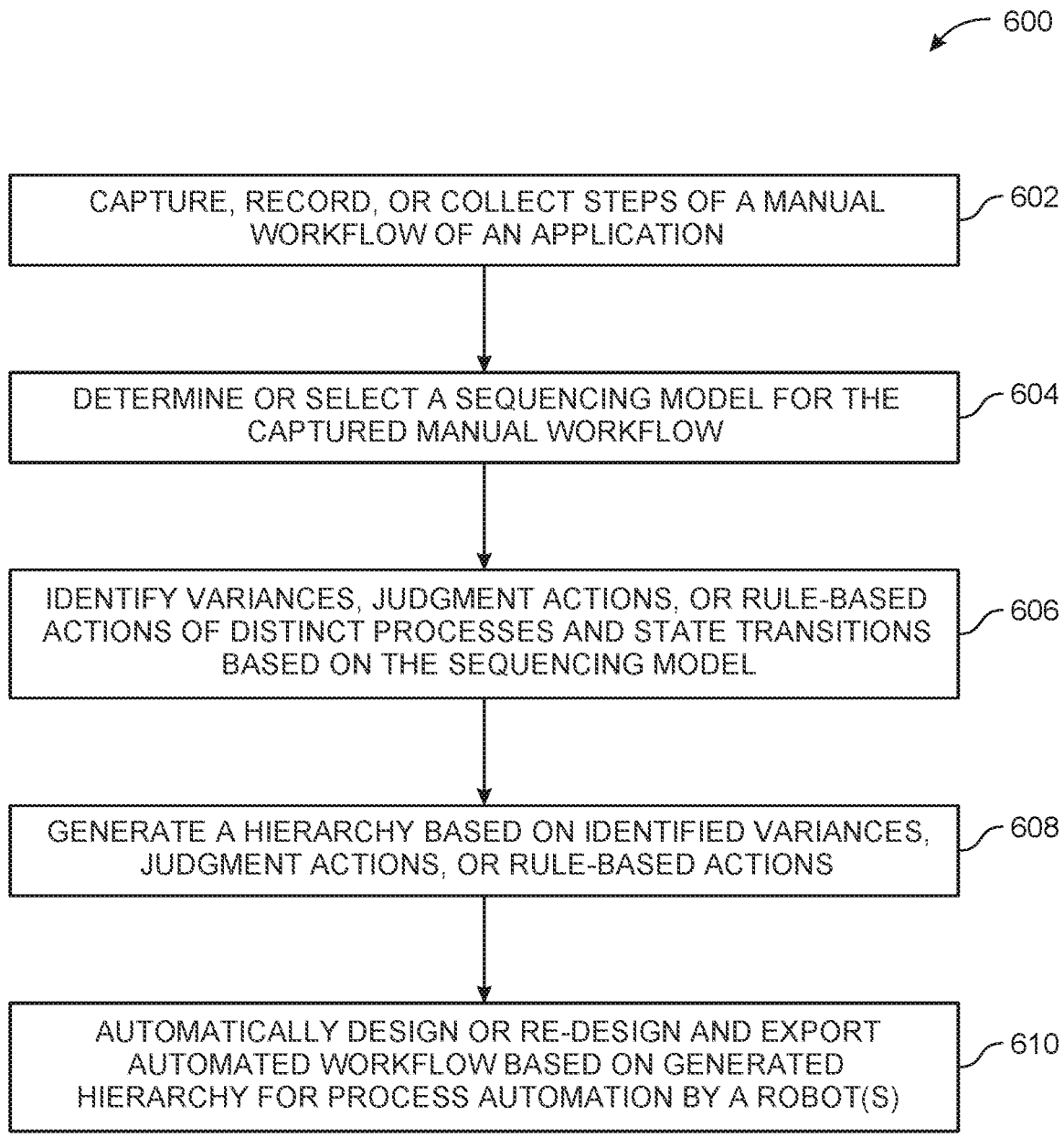
FIG. 6 is an illustration of automatic sequencing or pattern extraction for process understanding and automating a workflow for process automation by a robot.

FIG. 6 is an illustration of automatic sequencing or pattern extraction for process understanding and automating a workflow for process automation by a robot 600. Steps of a manual workflow of an application may be captured, recorded, collected, or the like (602). The captured steps may be stored in a log file or record file. A sequencing model for the captured manual workflow may be determined or selected (604). The sequencing model may include a plurality of distinct processes and state transitions for the captured manual workflow. Variances, judgment actions, or rule-based actions of a plurality of distinct processes and state transitions may be identified based on the sequencing model (606). Variances may be based on changes of log files of actions in relation to the captured steps. A hierarchy may be generated based on the identified variances, judgment actions, or rule-based actions (608). Automatically design or re-design and export an automated workflow based on the generated hierarchy for process automation by a robot(s) (610).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
a processor;
a memory; and
the processor is configured to retrieve, from the memory, captured steps of a workflow of an application to utilize a sequencing model for the captured steps, wherein the sequencing model determines a plurality of processes and state transitions for the captured steps;
the processor is configured to identify at least one of a variance, a judgment action, or a rule-based action of the plurality of processes and state transitions based on the sequencing model and changes of a log file of actions in relation to the captured steps;
the processor is configured to generate a hierarchy based on the identified variance, the judgment action, or the rule-based action, wherein the hierarchy is one of an exponentially decaying hierarchy having overlap between functional clusters or flat clusters; and
the processor is configured to automatically generate an automated workflow based on the generated hierarchy for process automation by a robot and control the process automation based on the generated automated workflow.

2. The computing device of claim 1, wherein the sequence model identifies a sub-sequence or sub-pattern appearing greater than a predetermined number of times in a row.

3. The computing device of claim 1, wherein the captured steps are randomized and the sequencing model identifies a process that occurs more than a predetermined number of times.

4. The computing device of claim 1, wherein telemetry data is utilized by the sequencing model.

5. The computing device of claim 1, wherein the variance, judgment action, or rule-based action are visualized for verification.

6. The computing device of claim 1, wherein each identified process of the plurality of processes is labeled.

7. The computing device of claim 1, wherein the actions include one of a screenshot, tree data, domain object model (DOM) data, a user interface element, a selector, an action type, clipboard content, or computing activity.

8. The computing device of claim 7, wherein the actions are arranged in rows that are clustered based on repetition or ranking.

9. A method performed by a computing system, the method comprising:
retrieving, by a processor of the computing system, captured steps of a workflow of an application to utilize a sequencing model for the captured steps, wherein the sequencing model determines a plurality of processes and state transitions for the captured steps;
identifying, by the processor, at least one of a variance, a judgment action, or a rule-based action of the plurality of processes and state transitions based on the sequencing model and changes of a log file of actions in relation to the captured steps;
generating, by the processor, a hierarchy based on the identified variance, the judgment action, or the rule-based action, wherein the hierarchy is one of an exponentially decaying hierarchy having overlap between functional clusters or flat clusters; and
generating, automatically, by the processor, an automated workflow based on the generated hierarchy for process automation by a robot and controlling the process automation based on the generated automated workflow.

10. The method of claim 9, wherein the sequence model identifies a sub-sequence or sub-pattern appearing greater than a predetermined number of times in a row.

11. The method of claim 9, wherein the captured steps are randomized and the sequencing model identifies a process that occurs more than a predetermined number of times.

12. The method of claim 9, wherein telemetry data is utilized by the sequencing model.

13. The method of claim 9, wherein the variance, judgment action, or rule-based action are visualized for verification.

14. The method of claim 9, wherein each identified process of the plurality of processes is labeled.

15. The method of claim 9, wherein the actions include one of a screenshot, tree data, domain object model (DOM) data, a user interface element, a selector, an action type, clipboard content, or computing activity.

16. The method of claim 15, wherein the actions are arranged in rows that are clustered based on repetition or ranking.

17. A computing device comprising:
a processor; and
a memory; and
the processor is configured to retrieve, from the memory, captured steps of a workflow of an application to utilize a sequencing model for the captured steps, wherein the sequencing model determines state transitions for the captured steps;
the processor is configured to identify a variance of the state transitions based on the sequencing model and changes of a log file of actions in relation to the captured steps;
the processor is configured to generate a hierarchy based on the identified variance, wherein the hierarchy is one of an exponentially decaying hierarchy having overlap between functional clusters or flat clusters; and
the processor is configured to automatically generate an automated workflow based on the generated hierarchy for process automation by a robot and control the process automation based on the generated automated workflow.

18. The computing device of claim 17, wherein the sequence model identifies a sub-sequence or sub-pattern appearing greater than a predetermined number of times in a row.

19. The computing device of claim 17, wherein the captured steps are randomized and the sequencing model identifies a process that occurs more than a predetermined number of times.

20. The computing device of claim 17, wherein telemetry data is utilized by the sequencing model.

* * * * *